(12) United States Patent
Sim

(10) Patent No.: US 11,970,165 B2
(45) Date of Patent: Apr. 30, 2024

(54) WIRELESS TERMINAL LOCATION INFORMATION-BASED ACCIDENT PREVENTION DEVICE AND METHOD

(71) Applicant: HL KLEMOVE CORP., Incheon (KR)

(72) Inventor: Sang Kyun Sim, Anyang-si (KR)

(73) Assignee: HL KLEMOVE CORP., Incheon (KR)

( * ) Notice: Subject to any disclaimer, the term of this patent is extended or adjusted under 35 U.S.C. 154(b) by 129 days.

(21) Appl. No.: 17/341,582

(22) Filed: Jun. 8, 2021

(65) Prior Publication Data

US 2021/0380104 A1     Dec. 9, 2021

(30) Foreign Application Priority Data

Jun. 8, 2020    (KR) ........................ 10-2020-0068780

(51) Int. Cl.
| | |
|---|---|
| *B60W 30/095* | (2012.01) |
| *B60W 30/09* | (2012.01) |
| *B60W 30/14* | (2006.01) |
| *G06V 20/58* | (2022.01) |
| *H04W 4/02* | (2018.01) |
| *H04W 4/40* | (2018.01) |
| *H04W 4/90* | (2018.01) |

(52) U.S. Cl.
CPC ........ *B60W 30/0956* (2013.01); *B60W 30/09* (2013.01); *B60W 30/146* (2013.01); *G06V 20/58* (2022.01); *H04W 4/025* (2013.01); *H04W 4/40* (2018.02); *H04W 4/90* (2018.02); *B60W 2554/80* (2020.02); *B60W 2556/45* (2020.02)

(58) Field of Classification Search
CPC ............. B60W 30/0956; B60W 30/09; B60W 30/146; B60W 2556/45; B60W 2554/80; H04W 4/40
See application file for complete search history.

(56) References Cited

U.S. PATENT DOCUMENTS

| | | | | |
|---|---|---|---|---|
| 9,465,105 | B2* | 10/2016 | Park ........................ | G01S 13/86 |
| 2015/0266473 | A1* | 9/2015 | Hayasaka .............. | B60W 30/09 |
| | | | | 701/70 |
| 2019/0351896 | A1* | 11/2019 | Solmaz ................ | G08G 1/0962 |
| 2021/0245742 | A1* | 8/2021 | Ha ........................ | B60Q 5/006 |
| 2023/0090474 | A1* | 3/2023 | Ohba ...................... | H04W 4/38 |
| | | | | 701/301 |

\* cited by examiner

*Primary Examiner* — Tarek Elarabi
(74) *Attorney, Agent, or Firm* — Hauptman Ham, LLP

(57) ABSTRACT

The embodiments of the present disclosure relate to a wireless terminal location information-based accident prevention device and method. Specifically, the wireless terminal location information-based accident prevention device according to the present disclosure may include a receiver for receiving GPS information of a wireless terminal located within a predetermined distance from a host vehicle, a sensor unit for detecting an object corresponding to the GPS information of the wireless terminal, and a controller configuring to determine a first time-to-collision with the object based on a change of the GPS information, to determine a second time-to-collision with the object based on motion information of the object detected by the sensor unit, and to control the host vehicle to prevent a collision with the object according to a predetermined criterion based on the first time-to-collision and the second time-to-collision.

16 Claims, 10 Drawing Sheets

After X seconds, the host vehicle is expected to collide with an object traveling straight from the right, and the host vehicle speed is reduced.

WIRELESS TERMINAL LOCATION INFORMATION-BASED ACCIDENT PREVENTION DEVICE AND METHOD

CROSS REFERENCE TO RELATED APPLICATION

This application claims priority from Korean Patent Application No. 10-2020-0068780, filed on Jun. 8, 2020, which is hereby incorporated by reference for all purposes as if fully set forth herein.

TECHNICAL FIELD

An embodiment of the present disclosure relates to a wireless terminal location information-based accident prevention device and method, more specifically, relates to a wireless terminal location information-based accident prevention device and method for preventing an accident in a situation where an object is not detected by a sensor using GPS information of the wireless terminal.

BACKGROUND

Recently, due to the improvement of vehicle control technology, various driver assistance systems (DAS) have been developed. Among these DAS systems, it is being developed the functions to secure vehicle stability or increase convenience by controlling a steering angle of a vehicle regardless of the intention of the driver.

The DAS system may detect the surrounding environment through a sensor provided in the vehicle and determine the danger. However, in the DAS system, if an object causing a collision with the host vehicle is obscured by a building or vehicle, since such an object cannot be detected with only a sensor provided in a vehicle, there is a problem that an effective response to an object suddenly appearing cannot be performed.

SUMMARY

In this background, embodiments of the present disclosure provide a wireless terminal location information-based accident prevention device and method capable of controlling the host vehicle to prevent an accident by using the GPS information of an object for an object not detected by a sensor due to an obstacle.

In an aspect of the present disclosure, there is provided a wireless terminal location information-based accident prevention device including a receiver for receiving GPS information of a wireless terminal located within a predetermined distance from a host vehicle, a sensor unit for detecting an object corresponding to the GPS information of the wireless terminal, and a controller configuring to determine a first time-to-collision with the object based on a change of the GPS information, to determine a second time-to-collision with the object based on motion information of the object detected by the sensor unit, and to control the host vehicle to prevent a collision with the object according to a predetermined criterion based on the first time-to-collision and the second time-to-collision.

In another aspect of the present disclosure, there is provided a wireless terminal location information-based accident prevention method including, receiving GPS information of a wireless terminal located within a predetermined distance from a host vehicle, detecting an object corresponding to the GPS information of the wireless terminal by a sensor provided in the host vehicle, determining a first time-to-collision with the object based on a change of the GPS information, determining a second time-to-collision with the object based on motion information of the object detected by the sensor, and controlling the host vehicle to avoid according to a predetermined criterion based on the first time-to-collision and the second time-to-collision.

According to an embodiment of the present disclosure, it is possible to provide a wireless terminal location information-based accident prevention device and method capable of identifying an object not detected by the sensor through GPS information of the wireless terminal, and controlling the host vehicle to prevent collision.

DETAILED DESCRIPTION

Figure 1:
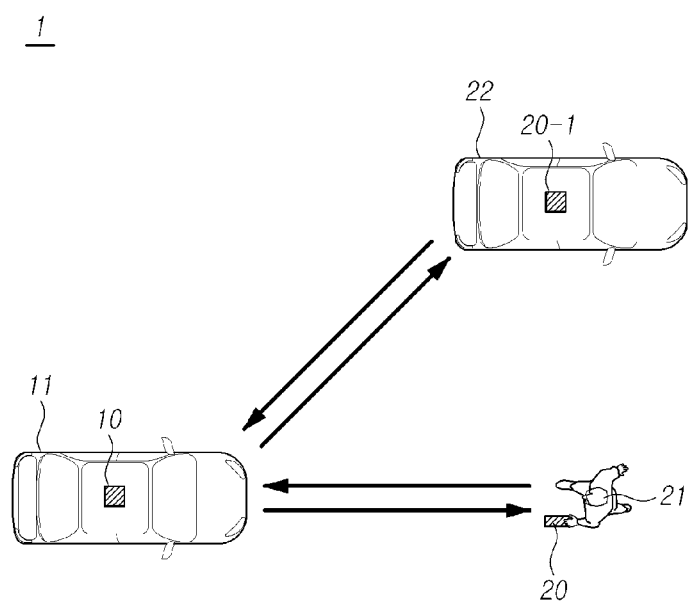
FIG. 1 schematically illustrates a wireless terminal location information-based accident prevention system according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a wireless terminal location information-based accident prevention system according to the present disclosure with reference to FIG. 1.

FIG. 1 schematically illustrates a wireless terminal location information-based accident prevention system 1 according to an embodiment of the present disclosure.

Referring to FIG. 1, a wireless terminal location information-based accident prevention system 1 according to the present disclosure may include a wireless terminal location information-based accident prevention device 10 and a wireless terminal 20.

The wireless terminal location information-based accident prevention device 10 may communicate with the wireless terminal 20 to receive GPS information. Here, the wireless terminal location information-based accident prevention device 10 may be provided in a host vehicle 11 to receive GPS information around the vehicle, and may be in the form of an electronic device carried by the driver. In addition, the vehicle equipped with the wireless terminal location information-based accident prevention device 10 may be a vehicle directly driven by a driver or an autonomous vehicle.

The host vehicle 11 refers to a vehicle that is made to move on the ground without a railroad track or an installed line by rolling wheels with its power by installing a prime mover. The host vehicle 11 may include the wireless terminal location information-based accident prevention device 10, and may receive a control signal for the host vehicle 11 thereby.

Hereinafter, it will be described a case in which the wireless terminal location information-based accident prevention device 10 operates to assist the driver in the host vehicle 11 driven by the driver. However, the present disclosure may be substantially equally applied to an autonomous vehicle, unless contradictory to the technical The wireless terminal location information-based accident prevention device 10 may detect objects 21 and 22 located within a predetermined distance, and determine whether the objects approach the wireless terminal location information-based accident prevention device 10. In addition, the wireless terminal location information-based accident prevention device 10 may determine or calculate the possibility of collision with respect to the objects 21 and 22 approaching the wireless terminal location information-based accident prevention device 10. The wireless terminal location information-based accident prevention device 10 may determine or calculate a time-to-collision with the objects 21 and 22, which is the time required for collision with the objects, based on the calculated collision probability, and may output the time-to-collision and a collision warning or transmit it to the wireless terminal 20.

In addition, the wireless terminal location information-based accident prevention device 10 may determine or calculate the possibility of collision with the wireless terminal 20 and other time-to-collision based on the GPS information provided from the wireless terminal 20, and may output the time-to-collision and a collision warning or may transmit it to the wireless terminal 20.

The wireless terminal 20 may communicate with the wireless terminal location information-based accident prevention device 10 to receive GPS information on the wireless terminal location information-based accident prevention device 10. Here, the wireless terminal 20 may mean a terminal capable of wireless communication while being carried by an individual, and, may include, for example, a mobile communication terminal, a personal portable communication terminal (PCS), a personal digital terminal (PDA), a smartphone, etc. In addition, the wireless terminal 20 may include a navigation device provided in another vehicle.

The wireless terminal 20 may provide GPS information to the wireless terminal location information-based accident prevention device 10. In addition, the wireless terminal 20 may be carried by a pedestrian, a passenger, a driver, or the like, or may be carried by a passenger of another vehicle.

Figure 2:
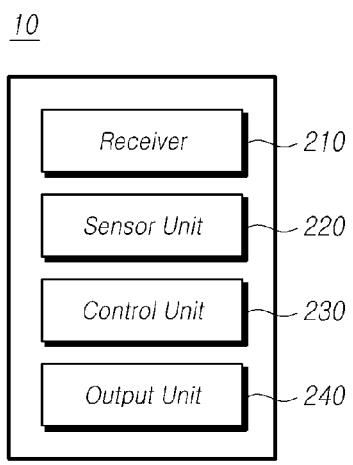
FIG. 2 is a block diagram of a wireless terminal location information-based accident prevention device according to an embodiment of the present disclosure.

FIG. 2 is a block diagram of a wireless terminal location information-based accident prevention device 10 according to an embodiment of the present disclosure.

The wireless terminal location information-based accident prevention device 10 may include a receiver 210, a sensor unit 220, a control unit 230 and an output unit 240. In this specification, the control unit 230 and the sensor unit 220 may be also referred as a controller and a sensor, respectively. In this case, in the wireless terminal location information-based accident prevention device 10, at least two of the receiving unit 210, the sensor unit 220, the control unit 230 and the output unit 240 may be integrated into a single component, so that the single component may perform two or more complex functions.

The receiver 210 may receive GPS information of the wireless terminal 20 located within a predetermined distance from the host vehicle 11. The receiver 210 may directly receive GPS information from the wireless terminal 20, or may receive GPS information of the wireless terminal 20 located within a predetermined distance from a server (not shown) that controls GPS information of a region including the host vehicle 11.

The receiver 210 may receive the GPS information of the wireless terminal 20 at a predetermined period or aperiodically until the corresponding wireless terminal 20 moves outside a predetermined distance.

The sensor unit 220 may detect objects 21 and 22 corresponding to GPS information of the wireless terminal 20.

The sensor unit 220 may include at least one of an image sensor such as a camera sensor to detect the objects 21 and 22, a lidar system to implement a 3D model around the periphery, and a radar sensor capable of measuring distance.

The sensor unit 220 may detect the objects 21 and 22 through the above-described sensors at a location corresponding to the received GPS information of the wireless terminal 20.

Figure 5:
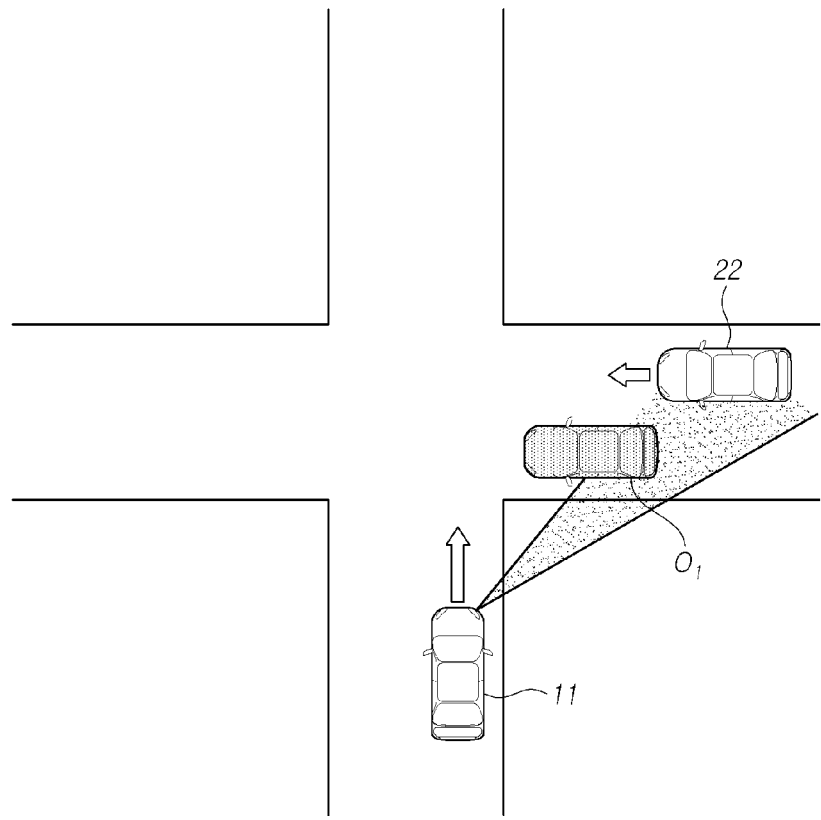
FIGS. 5 and 6 are diagrams for explaining control of a host vehicle according to an object obscured by an obstacle, according to an exemplary embodiment.
Figure 6:
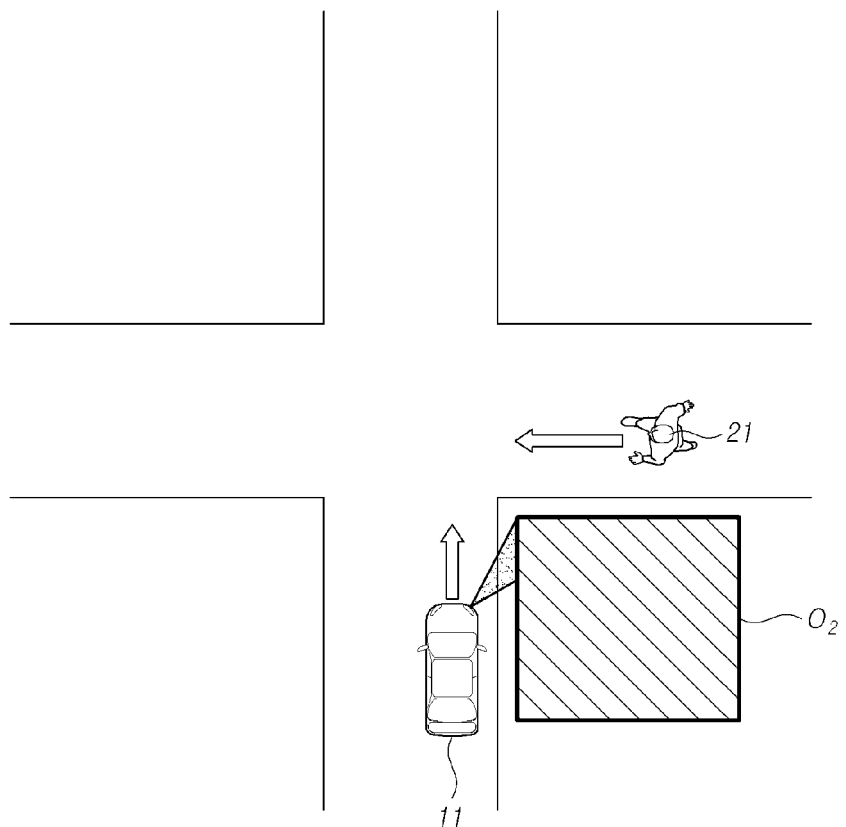

FIGS. 5 and 6 are diagrams for explaining control of a host vehicle according to an object obscured by the obstacles O1 and O2, according to an exemplary embodiment.

The sensor unit 220 may detect an obstacle. Here, the obstacles O1 and O2 may refer to various objects that interfere with the detection of the objects 21 and 22 corresponding to the GPS information of the wireless terminal 20. For example, the obstacle may be a stopped vehicle which interferes with the detecting of the objects 21 and 22 approaching the host vehicle 11, or may be a wall or a building that obstructs detecting of the objects 21 and 22 approaching the host vehicle 11 at an intersection.

The control unit 230 may calculate a first time-to-collision with the objects 21 and 22 based on the change of GPS information received from the wireless terminal 20, and may calculate a second time-to-collision with the objects 21 and 22 based on the motion information of the objects 21 and 22 detected by the sensor unit 220, and may control the host vehicle 11 to prevent a collision with the objects 21 and 22 according to a predetermined criterion based on the first time-to-collision and the second time-to-collision.

Specifically, the control unit 230 may determine the movement of the objects 21 and 22 based on the above-described change of GPS information, and calculate the moving direction and speed of the objects 21 and 22. The control unit 230 may compare the calculated moving direction and speed of the object with the moving direction and speed of the host vehicle 11 to calculate the first time-to-collision.

In the case that the first time-to-collision is less than or equal to a first reference value, the control unit 230 may generate a deceleration signal of the host vehicle 11. Here, the first reference value may be arbitrarily set, and is not limited to a specific time (value) as long as it is a value capable of preventing a collision only by deceleration.

The control unit 230 may control the host vehicle 11 to decelerate by generating a deceleration signal of the host vehicle 11 and transmitting the deceleration signal to each module capable of deceleration of the host vehicle 11.

In the case that the calculated first time-to-collision or second time-to-collision is less than or equal to a second reference value, the control unit 230 may generate a collision risk warning signal or a brake pressure increasing signal of the host vehicle 11. Here, the second reference value may be a value smaller than the first reference value.

For example, if the driver recognizes the objects 21 and 22 approaching the host vehicle 11 and determines that there is a time margin for avoiding or preventing a collision, the control unit 230 may generate a collision risk warning signal. Here, the time margin may be set as a time during which the driver can recognize the collision risk warning signal and perform an action for preventing collision after outputting the collision risk warning signal.

For another example, if it is determined that the driver recognizes the objects 21 and 22 approaching the host vehicle 11 by the collision risk warning signal but there is no time margin for avoiding or preventing a collision, the control unit 230 may generate a brake pressure increasing signal. Here, the brake pressure increasing signal may be a signal for increasing the braking force of the brake, and may be a brake operation signal for deceleration or stopping of the host vehicle 11.

The control unit 230 may generate an emergency braking signal or a steering avoidance signal of the vehicle in the case that the calculated first time-to-collision or the second time-to-collision is less than or equal to a third reference value. Here, the third reference value may be a value smaller than the second reference value.

For example, in the case of multiple lanes, the control unit 230 may generate a steering avoidance signal for changings lanes to the left or right to prevent a collision. Even if it is not a multi-lane case, if there is a space in which the host vehicle 11 can move on the left or right, a steering avoidance signal may be generated. In addition, the control unit 230 may control the steering module to change lanes by transmitting the steering avoidance signal. According to an example, the steering module may be implemented as an active front steering (AFS), a column-type electric power steering (C-EPS), an electronic control power steering (ECPS), etc., but is not limited thereto.

The wireless terminal location information-based accident prevention device 10 may include a lane departure warning system (LDWS), a lane keeping assist system (LKAS), and the like in order to perform the above-described lane change. In addition, the wireless terminal location information-based accident prevention device 10 may recognize a lane and determine a distance between the lanes through a camera and a distance sensor included in the sensor unit 220.

In another example, in the case of a single lane or a single road, an emergency braking signal of the host vehicle 11 may be generated to prevent a collision. The control unit 230 may control the brake module to perform emergency braking by transmitting the generated emergency braking signal, and control each module included in a pre-crash safety (PCS) to perform emergency braking.

If the driving path of the host vehicle 11 equipped with the wireless terminal location information-based accident prevention device 10 intersects with the moving path according to the above-described change in GPS information, the control unit 230 may calculate the first time-to-collision.

The control unit 230 may determine the moving path of the objects 21 and 22 detected by the sensor unit 220 and calculate a second time-to-collision if the moving path of the objects 21 and 22 crosses the driving path of the host vehicle 11.

The control unit 230 may represent the speed and direction of the host vehicle 11, and the speed and direction of GPS information by using a polar coordinate system. In addition, the control unit 230 may represent the relative speed and the relative position of the host vehicle 11 and the objects 21 and 22 by using a polar coordinate system, and may calculate the above-described first time-to-collision and second time-to-collision.

In generating signals corresponding to the above-described first time-to-collision and second time-to-collision, the control unit 230 may generate a signal by adding the presence of obstacles O1 and O2 as a condition. For example, the control unit 230 may generate a collision risk warning signal or a brake pressure increasing signal if obstacles O1 and O2 exist in addition to the case where the first time-to-collision or the second time-to-collision is less than the second reference value. For another example, the control unit 230 may generate an emergency braking signal or a steering avoidance signal if the first time-to-collision or the second time-to-collision is less than or equal to the third reference value, and obstacles O1 and O2 are present.

As described above, the wireless terminal location information-based accident prevention device 10 according to the present disclosure may provide an effect of more effectively preventing a collision with an object by controlling the host vehicle 11 based on the values of the first time-to-collision and the second time-to-collision.

The wireless terminal location information-based accident prevention device 10 may further include an output unit 240 for outputting collision risk information for a signal generated in response to the first time-to-collision and second time-to-collision.

The output unit 240 may transmit collision risk information to the wireless terminal 20. The collision risk information may include information corresponding to the deceleration signal of the host vehicle if the first time-to-collision is greater than the second reference value and less than the first reference value, or may include information corresponding to the collision risk warning signal or the brake pressure increasing signal of the host vehicle 11 if the first time-to-collision or the second time-to-collision is greater than the third reference value and less than the second reference value, or may include information corresponding to the emergency braking signal or steering avoidance signal of the host vehicle 11 if the first time-to-collision or the second time-to-collision is less than or equal to the third reference value.

Further, the output unit 240 may transmit collision risk information to the wireless terminal 20 in the case that the calculated first time-to-collision or second time-to-collision is less than or equal to the second reference value. In this case, the collision risk information may include information corresponding to the collision risk warning signal or the brake pressure increasing signal of the host vehicle 11 if the first time-to-collision or the second time-to-collision is greater than the third reference value and less than the second reference value, and may include information corresponding to the emergency braking signal or steering avoidance signal of the host vehicle 11 if the first time-to-collision or the second time-to-collision is less than or equal to the third reference value.

The output unit 240 may output information to the driver through a speaker or a navigation device, and is not limited to a specific module as long as it can transmit information to the driver. For example, the output unit 240 may output the estimated collision time between the object 22 and the host vehicle 11 according to the first time-to-collision and the second time-to-collision, a collision risk warning, the estimated position of the object, and the speed and direction of the host vehicle through the display panel provided in the host vehicle 11. For another example, the output unit 240 may output audio information related to the collision between the object 22 and the host vehicle 11 according to the first time-to-collision and the second time-to-collision through a speaker provided in the host vehicle 11.

Figure 3:
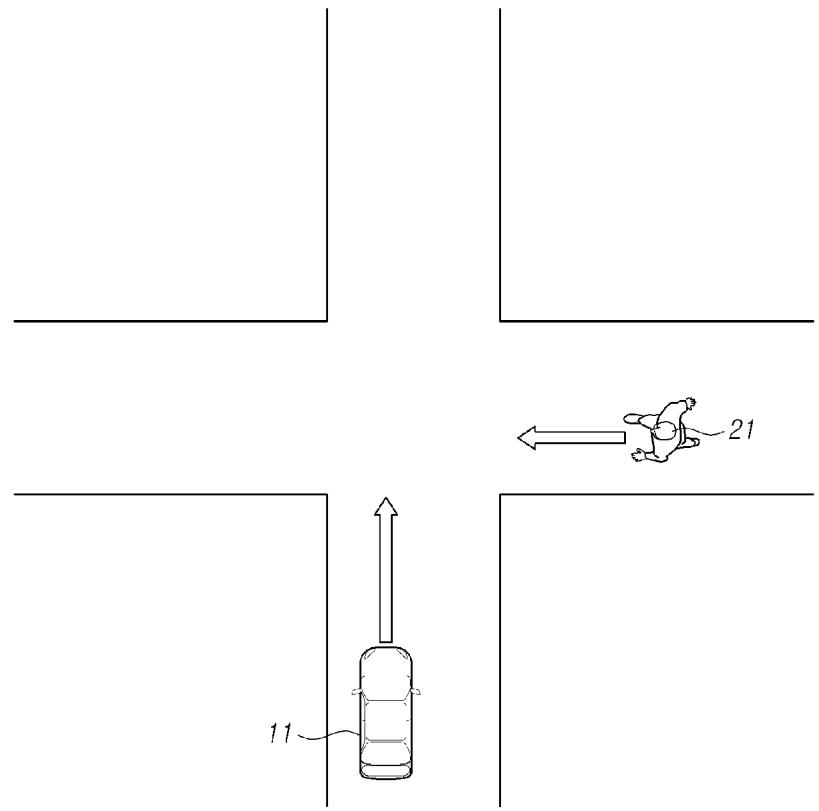
FIG. 3 illustrates an example of representing information on a signal generated in response to a first time-to-collision and a second time-to-collision according to an exemplary embodiment.

FIG. 3 illustrates an example of representing information on a signal generated in response to a first time-to-collision and a second time-to-collision according to an exemplary embodiment.

Referring to FIG. 3, the output unit 240 may output the time-to-collision between the host vehicle 11 and the object and information corresponding to the time-to-collision. For example, the output unit 240 may be implemented as a navigation system mounted inside the vehicle, and may represent the area in which the host vehicle 11 is located in the navigation in 2D or 3D, and may output information corresponding to the time-to-collision as a combination of a character string and a number string on the display panel of the navigation system. In addition, the output unit 240 may output the combination of the above-described character string and number string through a speaker included in the navigation system.

Accordingly, the wireless terminal location information-based accident prevention device 10 according to the present disclosure may have an effect of preventing a collision by intuitively transmitting information on a signal generated in response to the first time-to-collision and the second time-to-collision the driver.

Figure 4:
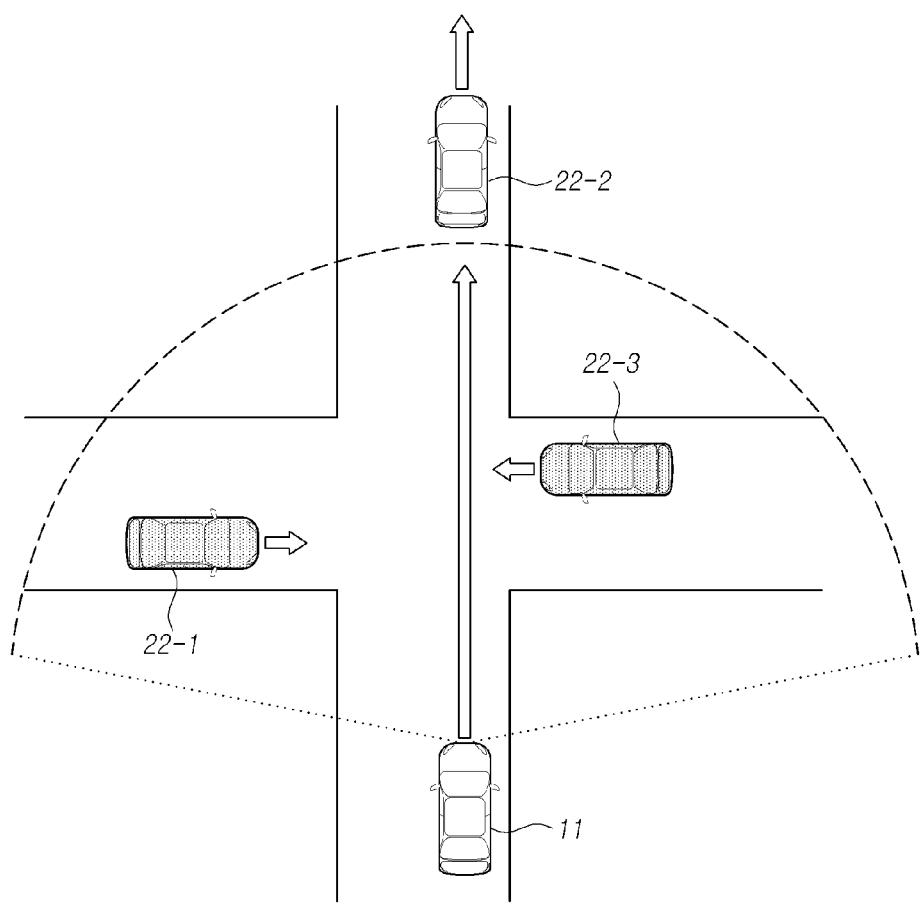
FIG. 4 illustrates an exemplary setting of a collision candidate group according to an embodiment.

FIG. 4 illustrates an exemplary setting of a collision candidate group according to an embodiment.

Referring to FIG. 4, in the case that the moving path of the wireless terminal 20 according to the above-described change in GPS information crosses the driving path of the host vehicle 11, the control unit 230 may set the wireless terminal 20 as a collision candidate group, and may determine the first time-to-collision with the objects 22-1 and 22-3 based on a change in GPS information of the wireless terminal 20 included in the collision candidate group. Here, the objects 22-1 and 22-3 are objects corresponding to GPS information of the wireless terminal included in the collision candidate group. That is, the control unit 230 may calculate the first time-to-collision only based on the GPS information of the wireless terminal 20 included in the collision candidate group. More specifically, referring to FIG. 4, in the case that the host vehicle 11 travels straight from the south side of the intersection to the north side at the intersection, the control unit 230 may determine an object 22-1 traveling straight from the left to the right of the intersection and the object 22-3 traveling straight from the right to the left of the intersection as the collision candidate group.

In the case that the moving path of the wireless terminal 20 according to the change in GPS information is adjacent to the driving path of the host vehicle 11, the control unit 230 may set a collision candidate group for the wireless terminal 20. For example, if the objects 21 and 22 according to the GPS information turn right to the right lane of the host vehicle 11 driving straight from the right side of the host vehicle 11, the control unit 230 may set these objects 21 and 22 as a collision candidate group and calculate a first time-to-collision between the objects 21 and 22 and the host vehicle 11. For another example, if the object 21 and 22 changes from the left lane of the host vehicle 11 to the lane of the host vehicle 11, the control unit 230 may set the objects 21 and 22 as a collision candidate group.

According to the above, the wireless terminal location information-based accident prevention device 10 according to the present disclosure may provide an effect of improving the computation speed by selectively calculating the first time-to-collision from the received GPS information.

Referring to FIG. 5, in the case that the object 22 detected by the sensor unit 220 is obscured or covered by the obstacle O1, the control unit 230 may determine the speed detected by the sensor unit 220 before the object 22 is obscured as the speed of the object 22, and may calculate a second time-to-collision.

The control unit 230 may detect the object 22 corresponding to the GPS information received from the wireless terminal 20 and maintain tracking. In addition, the control unit 230 may calculate the second time-to-collision between the host vehicle 11 and the object 22 by maintaining the tracking of the object 22. However, in this case, there may be a case where there is an obstacle preventing the detection of the object 22 approaching the host vehicle 11, such as the above-described stopped vehicle O1. In this case, if it is determined that the GPS information of the object obscured by the obstacle O1 does not decelerate with an acceleration greater than or equal to a threshold, the control unit 230 may determine a speed detected by the sensor unit 220 before being obscured by the obstacle O1 as a speed of the object 22 until the object 22 passes the obstacle O1 and is detected again by the sensor unit 220, and may calculate the second time-to-collision based on this. For example, if the speed of the object 22 before being obscured by the obstacle O1 is 60 km/h, the control unit 230 may determine that speed of the object 22 until the object 22 passes the obstacle O1 and is detected again by the sensor unit 220 is 60 km/h, and may calculate the second time-to-collision.

The control unit 230 may determine the moving direction in the same manner as the method of determining the speed of the object 22 while being obscured by the obstacle O1 described above. For example, if the moving direction of the object 22 detected before being obscured is the lateral direction, and moving direction of the object 22 detected after passing the obstacle O1 is also the lateral direction, the control unit 230 may determine a moving direction of the object from when the object 22 is obscured by the obstacle O1 until detected again by the sensor unit 220 as the lateral direction.

As described above, the wireless terminal location information-based accident prevention device 10 according to the present disclosure may estimate the speed of the object 22 obscured by the obstacle O1.

In the case that the object 22 detected by the sensor unit 220 is obscured by the obstacle O1, if the object 22 decelerates more than a predetermined acceleration, the control unit 230 may control the host vehicle 11 only with the first time-to-collision.

If the object 22 decelerates more than a predetermined acceleration while the object 22 is obscured by the obstacle O1, the control unit 230 may determine the movement of the object 22 obscured by the obstacle O1 based on the GPS information received from the wireless terminal 20 and calculate the first time-to-collision, and may control the host vehicle 11 to prevent a collision with only the first time-to-collision. In addition, the operation of the control unit 230 may be applied not only when the object 22 decelerates above a predetermined acceleration but also increases speed above a predetermined acceleration.

As described above, the wireless terminal location information-based accident prevention device 10 according to the present disclosure may detect the speed of the object obscured by the obstacle O1 and calculate the time-to-collision with the host vehicle 11, thereby preventing collision with the object 22 not detected by the sensor.

Referring to FIG. 6, even though the sensor unit 220 does not detect the object 21 corresponding to the GPS information of the wireless terminal 20, if the GPS information of the wireless terminal 20 is located within a predetermined distance, the control unit 230 may calculate the first time-to-collision by using only GPS information and may control the host vehicle 11 to prevent collision with the object 21.

Since the sensor unit 220 does not detect the object 21 obscured by the obstacle O2, the host vehicle 11 using the conventional sensor may be braked more urgently. Therefore, in order for the driver to respond more stably, if the driver sets a distance that the driver can respond to and recognizes the approaching object 21 in advance through the GPS information of the wireless terminal 20, the driver may secure time to respond.

Figure 7:
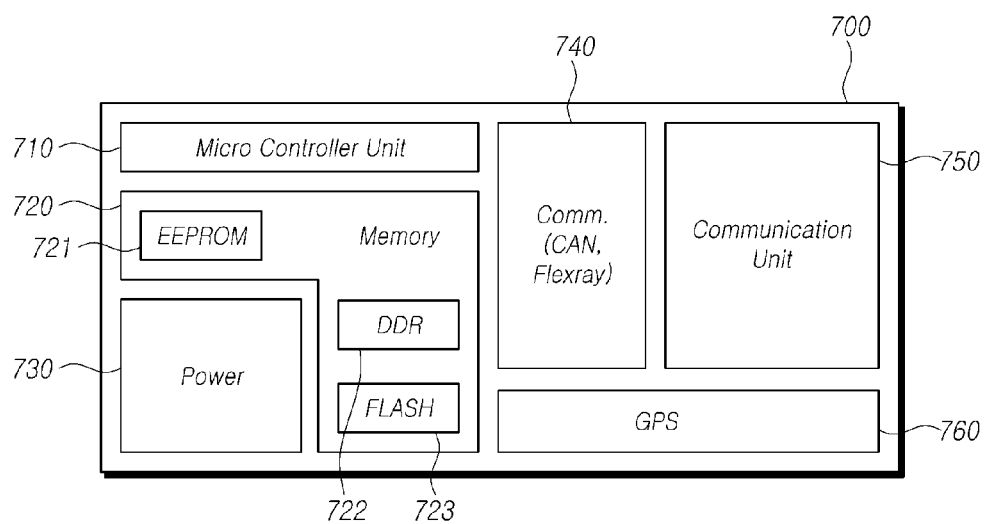
FIG. 7 is a block diagram of a wireless terminal location information-based accident prevention device according to an embodiment of the present disclosure.

FIG. 7 is a block diagram of a wireless terminal location information-based accident prevention device 10 according to an embodiment of the present disclosure.

Referring to FIG. 7, the wireless terminal location information-based accident prevention device 10 may be implemented as an electronic control unit (ECU, 700). The electronic control unit 700 may include at least one element of one or more microcontroller unit (MCU) 710, a memory 720, a POWER 730, a bus 740, a communication unit 750, and a GPS 760, and these elements may communicate with each other via bus 740. In addition, the electronic control unit 700 may access a network through the communication unit 750. The MCU 710 may be a CPU or a semiconductor device that executes processing instructions stored in the memory 720. The memory 720 may include various types of volatile/nonvolatile storage media. For example, the memory 720 may include an EEPROM 721, a DDR 722 and a FLASH 723.

In addition, the computer system 700 as the wireless terminal location information-based accident prevention device 10 may include a camera module capable of detecting and identifying external objects 21 and 22. For example, the camera module may include an image processor (not shown), an image sensor (not shown), and a lens (not shown).

Hereinafter, it will be described a wireless terminal location information-based accident prevention method using the wireless terminal location information-based accident prevention device 10 capable of performing all functions in the above-described present disclosure.

Figure 8:
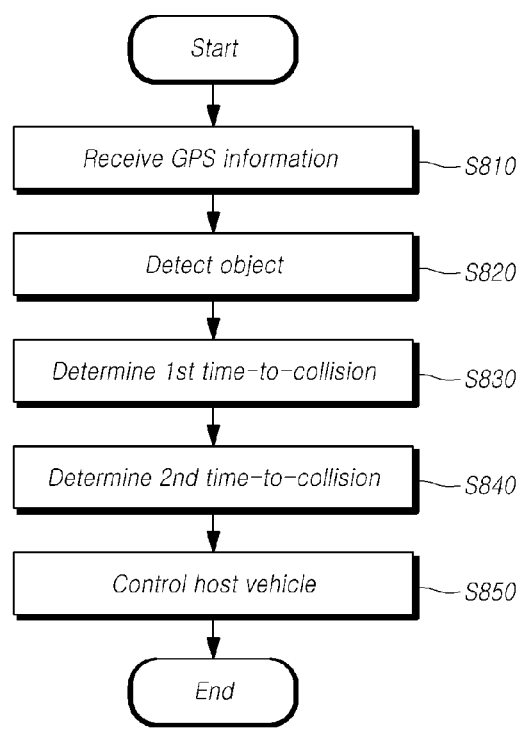
FIG. 8 is a flowchart illustrating a wireless terminal location information-based accident prevention method according to an embodiment of the present disclosure.

FIG. 8 is a flowchart illustrating a wireless terminal location information-based accident prevention method according to an embodiment of the present disclosure.

Referring to FIG. 8, a wireless terminal location information-based accident prevention method according to the present disclosure may include a step of receiving location information of a wireless terminal 20 from a GPS (Global Positioning System) receiver installed in a host vehicle 11 (S810), a step of detecting objects 21 and 22 corresponding to GPS information of the wireless terminal 20 by a sensor provided in the host vehicle 11 (S820), a step of determining a first time-to-collision with the objects 21 and 22 based on the change in GPS information (S830), a step of determining a second time-to-collision with the object based on motion information of the objects 21 and 22 detected by the sensor (S840), and a step of controlling the host vehicle 11 to avoid using a predetermined criterion based on the determined first time-to-collision and the second time-to-collision (S850).

The step S850 of controlling the host vehicle may include generating a deceleration signal of the host vehicle 11 if the first time-to-collision is less than or equal to a first reference value.

The step S850 of controlling the host vehicle may include generating a collision risk warning signal or a brake pressure increasing signal of the host vehicle 11 if the first time-to-collision or the second time-to-collision is less than or equal to a second reference value. In this case, the second reference value may be a value smaller than the first reference value.

The step S850 of controlling the host vehicle may include generating an emergency braking signal or steering avoidance signal of the host vehicle 11 if the first time-to-collision or the second time-to-collision is less than or equal to a third reference value. In this case, the third reference value may be a value smaller than the second reference value.

The step S850 of controlling the host vehicle may include, if the moving path of the wireless terminal 20 according to the change of GPS information crosses the driving path of the host vehicle 11, setting a collision candidate group and calculating a first time-to-collision with the objects 21 and 22 based on a change of GPS information included in the collision candidate group.

The step S840 of calculating of the second time-to-collision may include, if the object (21 or 22) detected by the sensor is obscured by an obstacle (O1 or O2), determining a speed detected by the sensor before being obscured as a speed of the object, and determining the second time-to-collision.

The step S850 of controlling the host vehicle may include, in the case that the object (21 or 22) detected by the sensor is obscured by an obstacle (O1 or O2), controlling the host vehicle 11 only with the first time-to-collision if the object decelerates more than a predetermined acceleration.

In addition, the wireless terminal location information-based accident prevention method according to the present disclosure may further include outputting collision risk information for a signal generated in response to the first time-to-collision and the second time-to-collision. The collision risk information may mean information on a signal generated by the host vehicle 11 to prevent a collision with the objects 21 and 22 based on a relationship between the first time-to-collision and the second time-to-collision and the first to third reference values.

In step of outputting collision risk information, the collision risk information may be transmitted to the wireless terminal 20. In addition, in step of outputting collision risk information, if the first time-to-collision or the second time-to-collision is less than or equal to the second reference value or less than the third reference value, the collision risk information may be transmitted to the wireless terminal 20.

Figure 9:
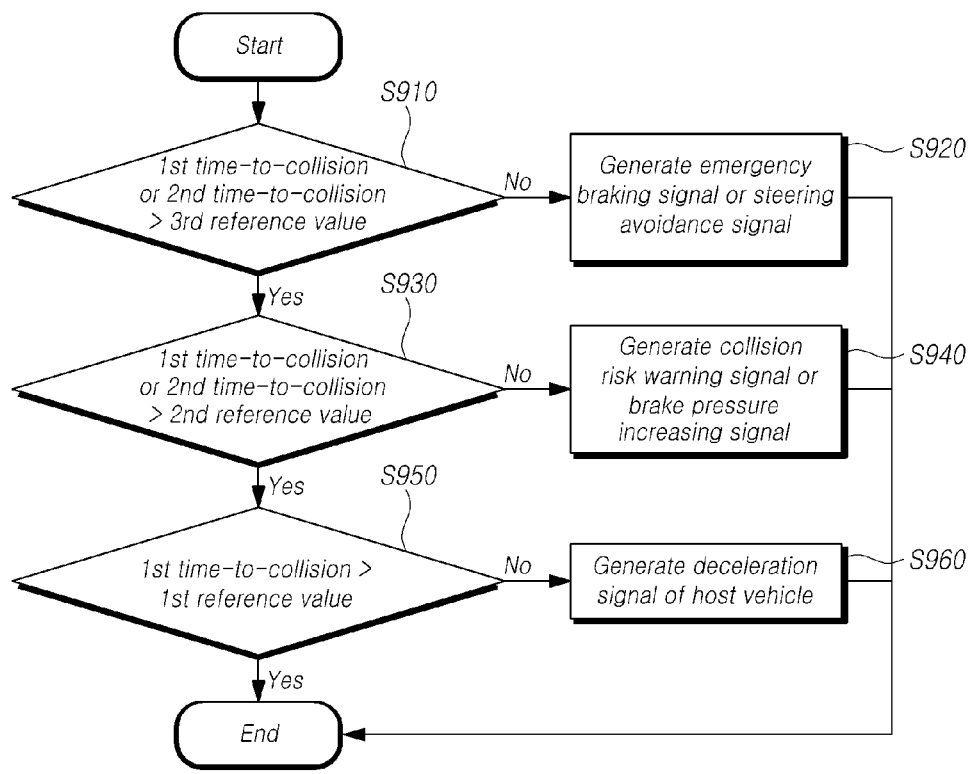
FIG. 9 is a flowchart illustrating a method of controlling a host vehicle based on a first time-to-collision and a second time-to-collision according to an exemplary embodiment.

FIG. 9 is a flowchart illustrating a method of controlling a host vehicle based on a first time-to-collision and a second time-to-collision according to an exemplary embodiment.

Referring to FIG. 9, the wireless terminal location information-based accident prevention device 10 may determine whether the first time-to-collision or the second time-to-collision exceeds a third reference value (S910).

In the case that the first time-to-collision or the second time-to-collision is less than or equal to the third reference value (S910—No), the wireless terminal location information-based accident prevention device 10 may generate an emergency braking signal or a steering avoidance signal (S920).

In the case that the first time-to-collision or the second time-to-collision exceeds the third reference value (S910—Yes), the wireless terminal location information-based accident prevention device 10 may determine whether the first time-to-collision or the second time-to-collision exceeds a second reference value (S930).

In the case that the first time-to-collision or the second time-to-collision is less than or equal to the second reference value (S930—No), the wireless terminal location information-based accident prevention device 10 may generate a collision risk warning signal or a brake pressure increasing signal (S940).

In the case that the first time-to-collision or the second time-to-collision exceeds the second reference value (S930—Yes), the wireless terminal location information-based accident prevention device 10 may determine whether the first time-to-collision exceeds a first reference value (S950).

If the first time-to-collision is less than or equal to the first reference value (S950—No), the wireless terminal location information-based accident prevention device 10 may generate a deceleration signal of the host vehicle 11 (S960).

In this case, the third reference value may be a value smaller than the second reference value, and the second reference value may be a value smaller than the first reference value.

Figure 10:
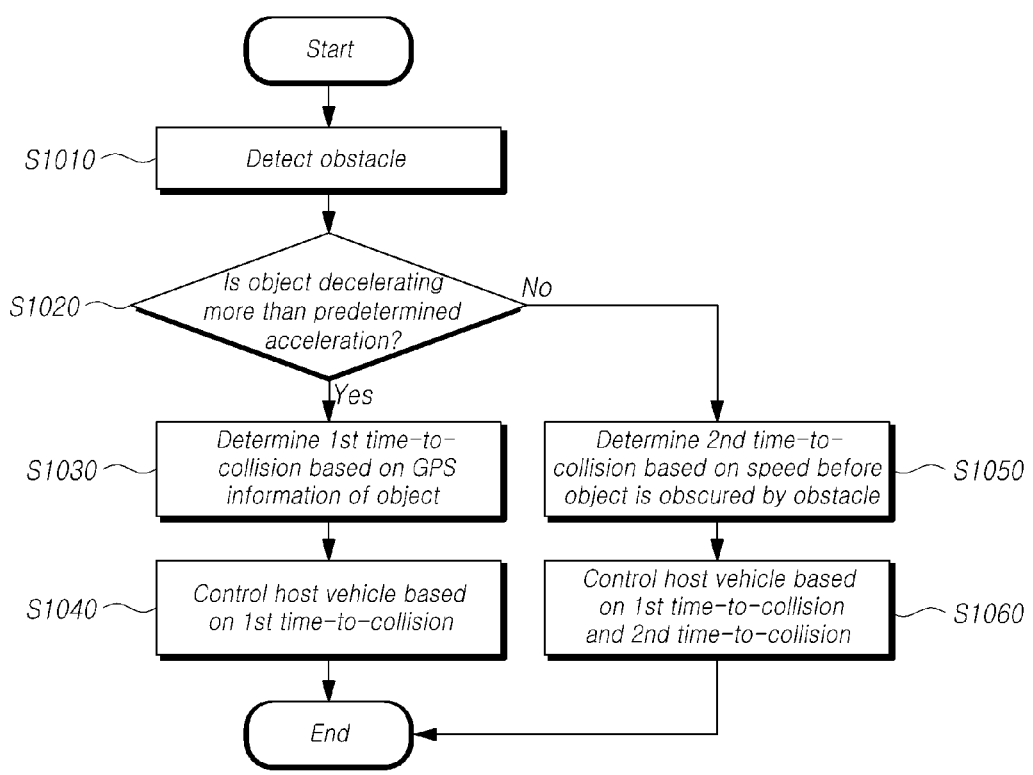
FIG. 10 is a flowchart illustrating a method of controlling a host vehicle based on to a first time-to-collision and a second time-to-collision in the case that an object is obscured by an obstacle, according to an exemplary embodiment.

FIG. 10 is a flowchart illustrating a method of controlling a host vehicle 11 based on to a first time-to-collision and a second time-to-collision in the case that the object 21 or 22 is obscured by an obstacle O1 or O2, according to an exemplary embodiment.

Referring to FIG. 10, the wireless terminal location information-based accident prevention device 10 may recognize the obstacles O1 and O2 (S1010). The obstacles O1 and O2 may be, for example, a stopped vehicle that interferes with the detection of the objects 21 and 22 approaching the host vehicle 11, or may be a wall or a building that obstructs detecting of the objects 21 and 22 approaching the host vehicle 11 at an intersection.

The wireless terminal location information-based accident prevention device 10 may determine whether the objects 21 and 22 decelerate more than a predetermined acceleration (S1020). The acceleration of the objects 21 and 22 obscured by the obstacles O1 and O2 may be determined by the GPS information of the wireless terminal 20, or may be determined by detecting the speed of the objects 21 and 22 detected after passing the obstacles O1 and O2.

In the case that the object 21 or 22 decelerates more than a predetermined acceleration (S1020—Yes), the wireless terminal location information-based accident prevention device 10 may calculate the first time-to-collision based on the GPS information of the objects 21 and 22 (S1030). The GPS information of the objects 21 and 22 may be the GPS information of the wireless terminal 20. In addition, The objects 21 and 22 may be objects detected by the wireless terminal location information-based accident prevention device 10 in response to GPS information of the wireless terminal 20.

The wireless terminal location information-based accident prevention device 10 may control the host vehicle 11 based on the first time-to-collision (S1040). The wireless terminal location information-based accident prevention device 10 may compare the first time-to-collision with the first reference value, the second reference value and the third reference value, and may generate a signal capable of controlling the host vehicle 11 according to the comparison result.

If the objects 21 and 22 do not decelerate mare than a predetermined acceleration (S1020—No), the wireless terminal location information-based accident prevention device 10 may calculate the second time-to-collision based on a speed of the objects 21 and 22 before being obscured by the obstacles O1 and O2 (S1050).

The wireless terminal location information-based accident prevention device 10 may control the host vehicle 11 based on the first time-to-collision and the second time-to-collision (S1060). The wireless terminal location information-based accident prevention device 10 may compare the first time-to-collision and the second time-to-collision with the first reference value, the second reference value and the third reference value, and may generate a signal capable of controlling the host vehicle 11 according to the comparison result.

As described above, according to the present disclosure, the wireless terminal location information-based accident prevention device 10 may detect objects 21 and 22 that are not detected by a sensor by using GPS information of the wireless terminal 20, and may control the host vehicle 11 to prevent a collision.

This wireless terminal location information-based accident prevention device and method may be implemented in the form of program instructions that can be executed through various computer components and may be recorded in a computer-readable recording medium. The above-described computer-readable recording medium may include program instructions, data files, data structures, and the like alone or in combination.

The program instructions recorded on the above-described computer-readable recording medium may be specially designed and constructed for the present disclosure, and may be known and usable to those skilled in the computer software field.

Examples of computer-readable recording media include magnetic media such as hard disks, floppy disks and magnetic tapes, optical recording media such as CD-ROMs and DVDs, and magnetic-optical media such as floptical disks, and hardware devices specially configured to store and execute program instructions such as ROM, RAM, flash memory, etc.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A wireless terminal location information-based accident prevention device comprising:
    a receiver configured to receive GPS information of a wireless terminal located within a predetermined distance from a host vehicle;
    a sensor unit configured to detect an object corresponding to the GPS information of the wireless terminal; and
    a controller configuring to
        determine a first time-to-collision with the detected object based on a change of the GPS information,
        determine a second time-to-collision with the detected object based on motion information of the detected object, and
        control the host vehicle to prevent a collision with the detected object according to a predetermined criterion based on the first time-to-collision and the second time-to-collision,
    wherein, when the detected object is obscured by an obstacle, the controller is configured to determine whether the speed of the detected object is changed from the speed of the detected object before being obscured based on the change of the GPS information of the detected object,
        if the speed of the detected object is not changed, determine the second time-to-collision based on the speed of the detected object detected by the sensor unit before being obscured, and control the host vehicle to prevent a collision with the detected object based on the first time-to-collision and the second time-to-collision, and
        if the speed of the detected object is changed, control the host vehicle to prevent a collision with the detected object based on the first time-to-collision.

2. The wireless terminal location information-based accident prevention device of claim 1, wherein the controller is configured to generate a deceleration signal of the host vehicle when the first time-to-collision is less than or equal to a first reference value.

3. The wireless terminal location information-based accident prevention device of claim 2, wherein the controller is configured to generate a collision risk warning signal or a brake pressure increasing signal of the host vehicle when the first time-to-collision or second time-to-collision is less than or equal to a second reference value, and the second reference value is a value smaller than the first reference value.

4. The wireless terminal location information-based accident prevention device of claim 3, wherein the controller is configured to generate an emergency braking signal or steering avoidance signal of the host vehicle when the first time-to-collision or second time-to-collision is less than or equal to a third reference value, and the third reference value is a value smaller than the second reference value.

5. The wireless terminal location information-based accident prevention device of claim 4, further comprising
    an output unit configured to output collision risk information for a signal generated in response to the first time-to-collision and the second time-to-collision.

6. The wireless terminal location information-based accident prevention device of claim 5, wherein the output unit is configured to transmit the collision risk information to the wireless terminal.

7. The wireless terminal location information-based accident prevention device of claim 5, wherein the output unit is configured to transmit the collision risk information to the wireless terminal when the first time-to-collision or the second time-to-collision is less than or equal to the second reference value or less than or equal to the third reference value.

8. The wireless terminal location information-based accident prevention device of claim 1, wherein, when a moving path of the wireless terminal according to the change of the GPS information crosses a driving path of the host vehicle, the controller is configured to set the wireless terminal as a collision candidate group, and determines the first time-to-collision with the detected object based on the change of the GPS information of the wireless terminal included in the collision candidate group.

9. A wireless terminal location information-based accident prevention method comprising:
    receiving GPS information of a wireless terminal located within a predetermined distance from a host vehicle;
    detecting an object corresponding to the GPS information of the wireless terminal by a sensor provided in the host vehicle;
    determining a first time-to-collision with the detected object based on a change of the GPS information;

determining a second time-to-collision with the detected object based on motion information of the detected object; and controlling the host vehicle to avoid according to a predetermined criterion based on the first time-to-collision and the second time-to-collision, wherein the controlling the host vehicle comprises, when the detected object is obscured by an obstacle, determining whether the speed of the detected object is changed from the speed of the detected object detected by the sensor before being obscured based on the change of the GPS information of the detected object, if the speed of the detected object is not changed, determining the second time-to-collision based on the speed of the detected object before being obscured, and controlling the host vehicle to prevent a collision with the detected object based on the first time-to-collision and the second time-to-collision, and if the speed of the detected object is changed, controlling the host vehicle to prevent a collision with the detected object based on the first time-to-collision.

10. The wireless terminal location information-based accident prevention method of claim 9, wherein the controlling of the host vehicle comprises generating a deceleration signal of the host vehicle when the first time-to-collision is less than or equal to a first reference value.

11. The wireless terminal location information-based accident prevention method of claim 10, wherein the controlling of the host vehicle comprises generating a collision risk warning signal or a brake pressure increasing signal of the host vehicle when the first time-to-collision or second time-to-collision is less than or equal to a second reference value, and the second reference value is a value smaller than the first reference value.

12. The wireless terminal location information-based accident prevention method of claim 11, wherein the controlling of the host vehicle comprises generating an emergency braking signal or steering avoidance signal of the host vehicle when the first time-to-collision or second time-to-collision is less than or equal to a third reference value, and the third reference value is a value smaller than the second reference value.

13. The wireless terminal location information-based accident prevention method of claim 12, further comprising
outputting collision risk information for a signal generated in response to the first time-to-collision and the second time-to-collision.

14. The wireless terminal location information-based accident prevention method of claim 13, wherein the outputting comprises transmitting the collision risk information to the wireless terminal.

15. The wireless terminal location information-based accident prevention method of claim 14, wherein the outputting comprises transmitting the collision risk information to the wireless terminal when the first time-to-collision or the second time-to-collision is less than or equal to the second reference value or less than or equal to the third reference value.

16. The wireless terminal location information-based accident prevention method of claim 9, wherein the controlling of the host vehicle comprises, when a moving path of the wireless terminal according to the change of the GPS information crosses a driving path of the host vehicle, setting the wireless terminal as a collision candidate group, and determining the first time-to-collision with the detected object based on the change of the GPS information of the wireless terminal included in the collision candidate group.

* * * * *